Sept. 10, 1963 A. B. MARMO 3,103,338
ELECTRO-MAGNETICALLY OPERATED PILOT VALVE
Filed Oct. 14, 1960 2 Sheets-Sheet 1

INVENTOR
ANTHONY B. MARMO
BY
ATTORNEY

Sept. 10, 1963 A. B. MARMO 3,103,338
ELECTRO-MAGNETICALLY OPERATED PILOT VALVE
Filed Oct. 14, 1960 2 Sheets-Sheet 2

INVENTOR
ANTHONY B. MARMO
BY
ATTORNEY

United States Patent Office 3,103,338
Patented Sept. 10, 1963

3,103,338
ELECTRO-MAGNETICALLY OPERATED
PILOT VALVE
Anthony E. Marmo, Pompano Beach, Fla., assignor to Ranco Incorporated, Columbus, Ohio, a corporation of Ohio
Filed Oct. 14, 1960, Ser. No. 62,689
4 Claims. (Cl. 251—45)

The present invention relates to an improved valve structure of the type comprising a valve chamber having an inlet and a main flow port therefrom, the latter arranged to be closed by a main valve member actuated by a diaphragm partitioning the chamber into two compartments, one including the inlet and flow port, and which diaphragm is shifted to operate the valve member by changes in fluid pressure on opposite sides thereof effected by bleeding fluid from the one compartment to the other and selectively discharging fluid from the other compartment through a pilot valve at a greater rate than fluid can be replaced through the bleed into the latter compartment.

Valves of the type mentioned above are well known, and when they are subject to wide changes in fluid pressure, the rate of fluid flow through the bleed connection between the compartments changes according to the pressure changes, and if satisfactory operation is provided at one fluid pressure, higher pressures may cause undesirable pounding of the valve member in closing its port.

The principal object of the present invention is the provision of an improved automatic fluid bleed control through the diaphragm of a valve of the type mentioned, the diaphragm having a resilient annular corrugation formed therein which is backed by a relatively rigid plate to form a circuitous fluid passage, the inlet of which comprises an opening in a wall of the corrugation and the outlet of which is formed by a channel formed in the corrugation leading from the interior of the corrugation beyond the edge of the backing plate. By this arrangement changes in fluid pressure in the one compartment tend to flatten or relax the corrugation of the diaphragm, according to increases or decreases in fluid pressure, thereby decreasing or increasing, respectively, the cross-sectional area of the conduit to provide a controllable fluid flow rate over a wide change in fluid pressures.

Other objects of the invention will be apparent from the following description of the preferred form thereof, reference being made to the accompanying drawings wherein FIG. 1 is a sectional view of a solenoid operated pilot valve embodying the invention;

Figure 2:
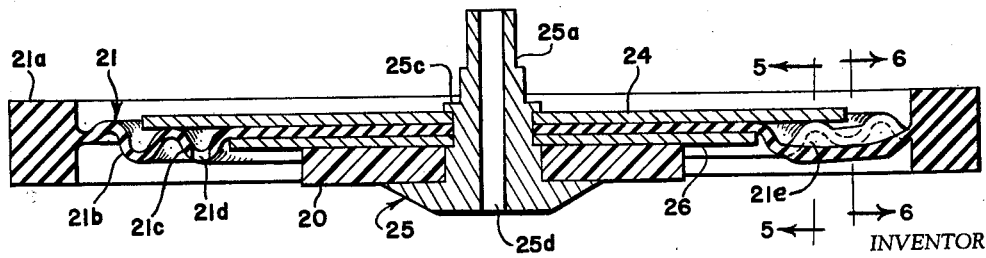
FIG. 2 is a sectional view of a diaphragm assembly of the valve shown in FIG. 1, but on a larger scale.
Figure 5:
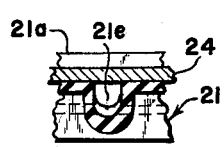
Figure 6:
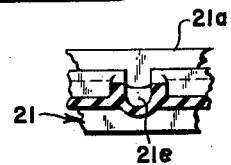
Figure 4:
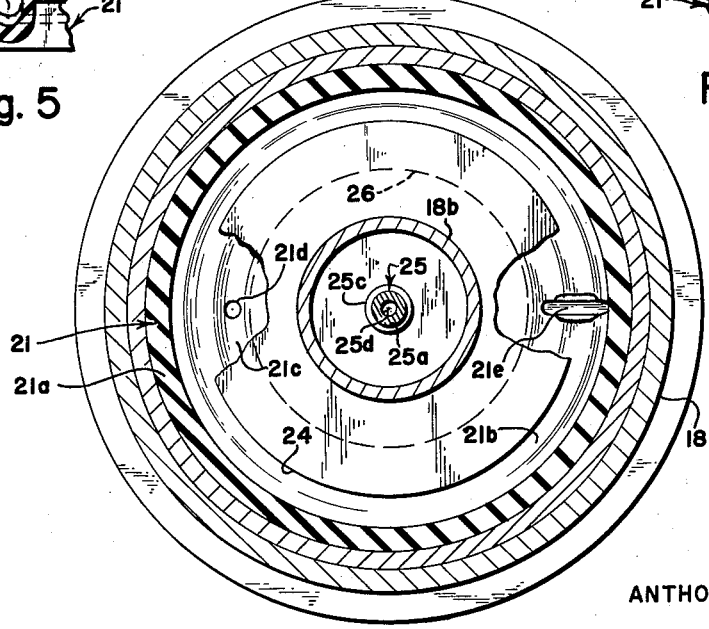
FIG. 4 is a sectional view taken along line 4—4 of FIG. 1.

FIGS. 5 and 6 are fragmentary sectional views taken along lines 5—5 and 6—6 respectively of FIG. 2.

Referring to the drawings, a two-way solenoid operated fluid valve is shown which is particularly suitable for controlling the flow of a heat exchange medium, such as water, through the valve to a heat exchanger (not shown) in accordance with the energization of a solenoid controlled by a suitable automatic device, such as a thermostatically operated switch, not shown. In the present form of the invention, a valve body 10 is provided, having a chamber 11 formed therein into which a threaded inlet opening 12 opens and which may be conveniently connected to a source of liquid to be controlled. The top portion of chamber 11 is circular and centrally disposed therein is a main fluid flow valve port 13 which is connected by a passage 14 to a threaded outlet 15 which may be connected by a pipe to a device such as a heat exchanger. The top of valve body 10 is closed by a cover 18 threaded thereon and which includes a solenoid operated pilot valve mechanism described more fully hereinafter.

Main valve port 13 is adapted to be closed by a suitable valve member 20 arranged to be moved to and from the port by a diaphragm 21, preferably of a rubber-like resilient material and which is hermetically sealed about its periphery to the upper edge portions of chamber 11 as shown, the diaphragm having a rim 21a which is pressed by cover 18 to an annular shoulder 22 surrounding the upper portion of chamber 11. Flexibility is achieved in the diaphragm by two concentric convolutions or corrugations 21b and 21c so that the diaphragm may move up and down relatively easily and to provide a bleed passage, as described more fully hereinafter.

Figure 1:
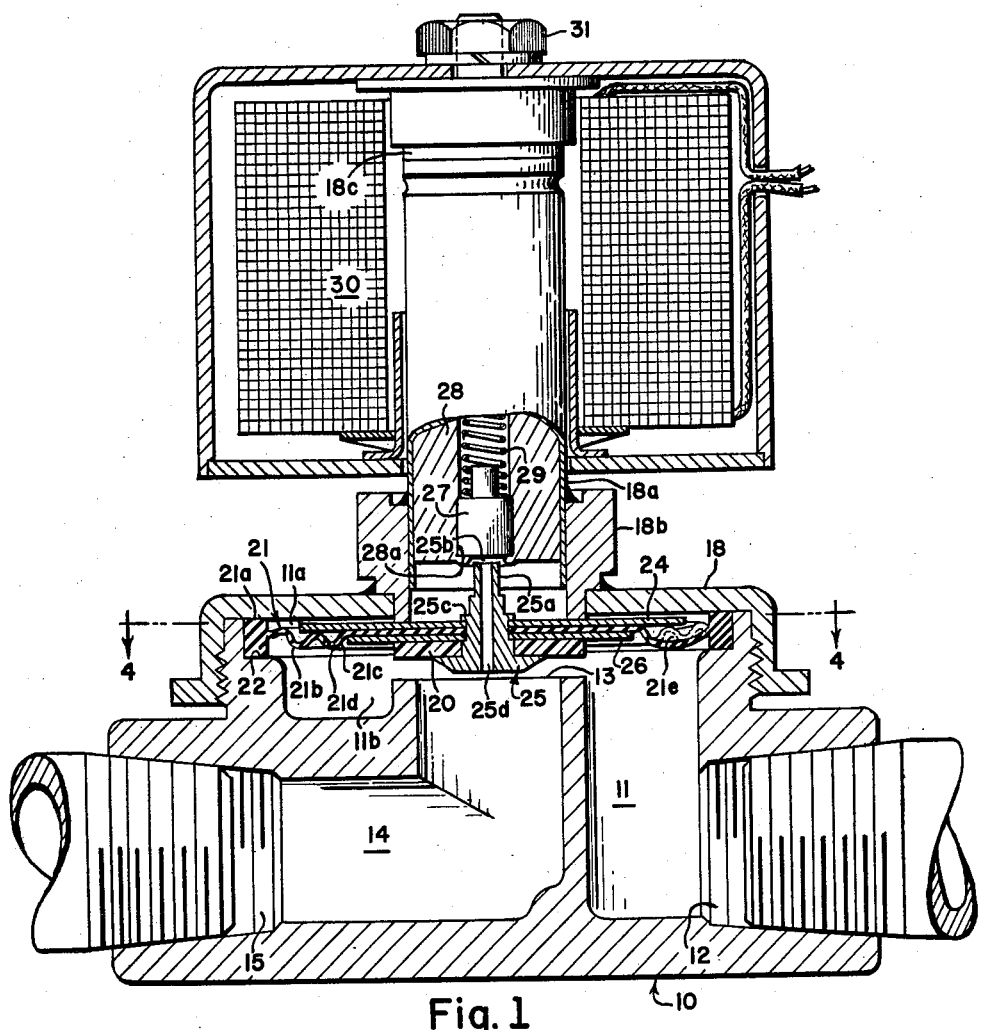
Figure 3:
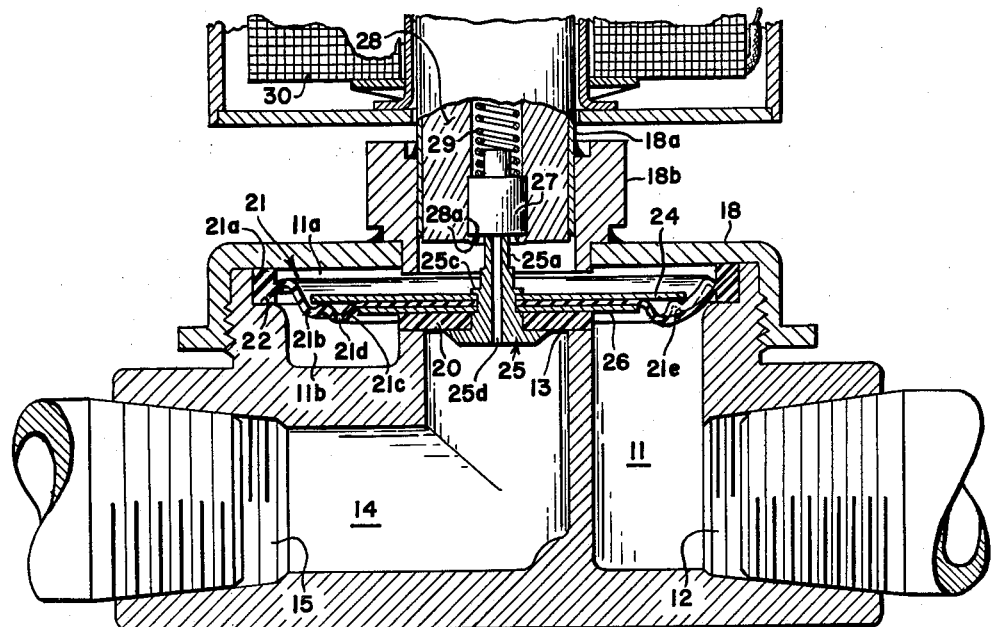
FIG. 3 is a sectional view of the valve shown in FIG. 1, but showing certain parts thereof in a different position.

Diaphragm 21 partitions chamber 11 into upper and lower compartments, 11a and 11b, and the diaphragm is moved upwardly or downwardly, as viewed in FIGS. 1 and 3, by changes in fluid pressure above and below the diaphragm, as is selectively controlled in a manner described presently.

The open side of the annular corrugation 21c is spanned by a rigid metallic circular plate 24 so that the plate and convolutions form an annular fluid bleed passage having its inlet at 21d and its outlet at 21e. The outlet of the fluid passage is 180° from opening 21d and comprises a channel 21e extending radially of the diaphragm and intersecting corrugations 21b, 21c and which extends beyond the periphery of plate 24, as clearly seen in FIG. 2. By this arrangement, fluid is conducted from lower compartment 11b to upper compartment 11a through the passage just described at a limited rate so that the fluid pressures above and below the diaphragm can equalize under certain conditions, as is described more fully hereinafter.

Fluid may be discharged from upper compartment 11a into outlet passage 14 by way of a pilot valve 25 at a greater rate than fluid may enter the compartment through passage formed by 21d, 21c, 21e, whereby a pressure differential is produced on opposite sides of the diaphragm. Pilot valve 25 comprises a hollow stem 25a which is attached to and projects through valve member 20 and which provides a pilot valve port 25b in compartment 11a. As seen in FIG. 2, pilot valve stem 25a includes annular shoulder portions between which valve member 20, a washer plate 26 and the upper edge of plate 24 are gripped and firmly clamped together, the shoulders including a rolled over shoulder portion 25c. Pilot valve stem 25a includes an axial bore 25d which permits fluid to drain from upper compartment 11a through port 13 and into outlet 14 at a greater rate than fluid can be replaced in the upper chamber through bleed passage 21d, etc., so that the fluid pressure in compartment 11b will cause diaphragm 21 to raise valve member 20 from port 13. On the other hand, when port 25b is closed by a pilot valve member 27, described more fully hereinafter, the fluid pressure above the diaphragm is that of the inlet whereas the pressure below the diaphragm is less due to the reduced pressure at the outlet; consequently the net force above the diaphragm is greater than that therebelow and the diaphragm is urged to seat on port 13.

Pilot port 25b is preferably controlled by the solenoid actuated valve member 27 which is disposed in the open core of an armature 28 arranged to move longitudinally within a sleeve 18a hermetically joined to cover 18 by a bushing 18b brazed thereto, the upper end of which sleeve is hermetically closed by a plug 18c. Pilot valve member 27 is retained in the lower end of the core of armature 28 within an enlarged portion 28a. A compression spring 29 is located inside the armature core and acts between plug 18c and the top portion of the valve member to urge armature 28 downwardly and to close the valve member 27 on pilot port 25b.

Armature 28 is raised from pilot valve port 25b by a conventional solenoid 30 which surrounds sleeve 18a and which is attached in place by a nut 31 threaded on a stem formed on plug 18c. Although not shown, it may be desirable to provide shock absorbing means to prevent striking of armature 28 against plug 18c, but since such expedient is not essential to the present invention, it is not shown.

With the exception of the fluid flow passage comprising diaphragm corrugation 21c, opening 21d and channel 21e, solenoid operated valves similar to that described are well known in the art but are subject to the disadvantages that the diaphragm has a fixed orifice which effects a desired rate of valve closure in one pressure range but at pressures above or below such range the valve closes too rapidly or too slowly, respectively. Furthermore, the pressures on opposite sides of the diaphragm vary rapidly during closure which results in irregular operation of the valve. In addition to the aforementioned difficulties with a fixed orifice passage, in many instances the orifice must be so small that it is difficult to manufacture and it tends to clog in use.

The present invention overcomes these disadvantages by reducing the effective size of the fluid flow passage in response to either the general operating pressure range of the valve or the rapid pressure changes which occur in the diaphragm area while the valve is closing. Furthermore, the system will accommodate high pressures without fear of clogging, because opening 21d need not be reduced in size for high pressure applications.

The operation of the valve is as follows:

When solenoid 30 is de-energized pilot valve member 27 closes port 25b and liquid entering chamber 11 flows upwardly from compartment 11b to compartment 11a through opening 21d, convolution 21c and out channel 21e into compartment 11a which, being closed, causes the fluid pressure to act on the upper side of diaphragm 21 to close valve member 20 on port 13 in the manner described hereinbefore. However, the diaphragm can only move down as rapidly as fluid can pass through the passage provided by opening 21d, convolution 21c and channel 21e. The rate at which the valve closes, and the manner in which it closes, are thereby controlled by the effective size of the bleed opening and the response of this opening to transient pressure variations. At higher pressures than normal, the convolution 21c will tend to be flattened on plate 24, due to the flexible nature of diaphragm material 21, thereby reducing the cross-sectional area of the annular passage formed between the plate and the inside of convolution 21c. This reduction in cross-sectional area compensates for the increase in pressure so that the unit volume of flow of liquid into the upper chamber is not as great as that which would occur with a fixed orifice or the like. This is important because the flow of liquid into the upper compartment 11a determines the rate at which diaphragm 21 will move downwardly to close valve member 20 on port 13, and if this rate is too great the valve member will pound when it closes and create considerable noise. On the other hand, when the pressure of liquid in compartment 11b decreases, the natural resiliency of the walls of the convolution 21c causes them to tend to assume their normal form and thereby create a freer fluid flow through the bleed passage from compartment 11b to compartment 11a.

By the construction shown the annular bleed passage provided by corrugation 21b forms a relatively long path of travel for the liquid and affords a greater restriction than if the single opening 21d were connected directly to the upper compartment 11a. Furthermore, the lengthy passage impedes the liquid flow so that bleed opening 21d can be of greater diameter than if furnishing the sole passage, which tends to obviate clogging of the opening due to foreign matter in the liquid. The novel arrangement enables the bleed passage to be quickly cleaned merely by removal of the diaphragm from the valve housing and flexing it from plate 24 to expose the entire convolution for cleansing thereof. Thus, the valve is relatively easy to manufacture and maintain.

Although I have described but one form of the invention, it is to be understood that other forms, modifications and adaptations could be made, all falling within the scope of the claims which follow.

I claim:

1. In a valve mechanism comprising a valve body having a chamber including an inlet and an outlet, a main flow port in said chamber connected with said outlet, a valve member arranged to close on said main port, a diaphragm for actuating said valve member, said diaphragm separating said chamber into two compartments, one compartment including said inlet and said main valve port, a pilot valve means including a port leading from the other compartment to said outlet, a pilot valve member for controlling flow through said pilot port, and means forming a fluid connection between said two compartments comprising a corrugation formed in said diaphragm and having resilient walls, a flat backing plate having an imperforate portion closing the open side of said corrugation, a fluid opening in the walls of said corrugation to provide communication with said one compartment, and a fluid passage leading from said corrugation to beyond the outer edge of said plate into the said other compartment.

2. A valve mechanism as defined in claim 1 in which the opening to said fluid passage is disposed at 180° from said fluid opening in the walls of said corrugation.

3. A valve mechanism as defined in claim 1 in which said fluid passage comprises a channel extending radially from said corrugation beyond said plate.

4. A valve mechanism as defined in claim 1 in which said fluid passage comprises a channel extending radially from the interior of said corrugation to beyond said plate and at 180° from said fluid opening.

References Cited in the file of this patent

UNITED STATES PATENTS

| 2,870,986 | Vargo | Jan. 27, 1959 |

FOREIGN PATENTS

| 1,048,455 | Germany | Jan. 8, 1959 |
| 1,086,097 | Germany | July 28, 1960 |